United States Patent [19]

Hoekstra

[11] 4,189,309
[45] Feb. 19, 1980

[54] DESULFURIZATION OF FLUE GAS

[76] Inventor: Irenus A. Hoekstra, 28 Lynn Lea, Williamsville, N.Y. 14221

[21] Appl. No.: 886,610

[22] Filed: Mar. 14, 1978

[51] Int. Cl.² ............................................. B01D 19/00
[52] U.S. Cl. ........................................... 55/44; 55/48; 55/50; 55/55; 55/73
[58] Field of Search .................... 55/27, 40, 44, 48, 49, 55/50, 57, 73, 89

[56] References Cited

U.S. PATENT DOCUMENTS

| | | | |
|---|---|---|---|
| 1,387,857 | 8/1921 | McKee | 55/73 X |
| 1,417,066 | 5/1922 | Howard | 55/73 X |
| 1,469,959 | 10/1923 | Richter et al. | 55/73 X |
| 1,724,421 | 8/1929 | Richter | 55/73 X |
| 1,992,295 | 2/1935 | De Jahn et al. | 55/40 |
| 2,598,116 | 5/1952 | DuBois | 55/73 |
| 2,871,979 | 2/1959 | Scofield | 55/89 X |
| 3,511,027 | 5/1970 | Roberts et al. | 55/44 |
| 3,853,502 | 12/1974 | Dorr et al. | 55/48 |

*Primary Examiner*—Robert H. Spitzer
*Attorney, Agent, or Firm*—Bean, Kauffman & Bean

[57] ABSTRACT

A method of desulfurization of flue gas involves the use of two recirculating water systems separated by a secondary cooling stage. In the first system, partial cooling and removal of some particulates and $SO_3$ is effected by direct contact of the gas and water, followed by the secondary cooling which further removes particulates and $SO_3$ in the condensate. In the second recirculating water system, $SO_2$ is first absorbed under atmospheric conditions and is then desorbed under vacuum conditions to effect refrigeration of the recirculating water. The refrigerating effect is balanced against the contact and secondary cooling of the gas to stabilize the temperature at which absorption takes place such that a selected percentage of $SO_2$ is removed from the gas.

6 Claims, 4 Drawing Figures

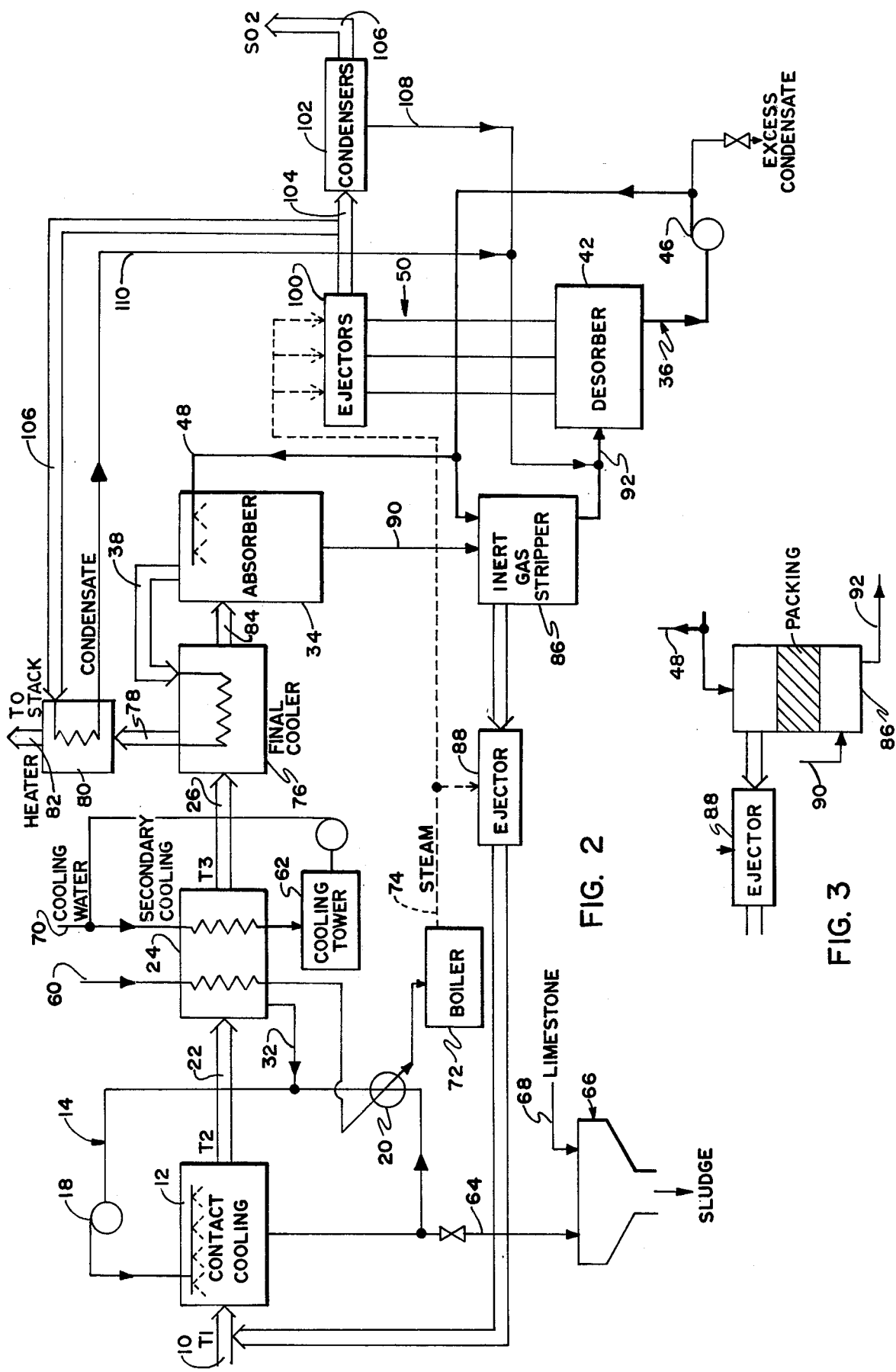

DESULFURIZATION OF FLUE GAS

BACKGROUND OF THE INVENTION

Desulfurization of various effluent gases contemporarily poses a serious problem even though the problem, at least in theory, is subject to rather direct and seemingly simple solutions. However, to carry these solutions into practical effect has been at best difficult. For example, chemical treatments which have been proposed are unusually wasteful of treating reagents and normally pose serious disposal problems because of the large amounts of spent waste which are involved. The more sophisticated chemical treatment methods also require significant amounts of relatively expensive reagents. Other methods have been proposed which involve recovery of the $SO_2$ component as a valuable product. One such method is disclosed in the Roberts et al U.S. Pat. No. 3,511,027, and involves a system employing water to cool effluent gases and absorb $SO_2$ therefrom. The $SO_2$ is later stripped and recovered as a valuable product. It may be used, for example, directly for the production of sulfuric acid or it may be liquified, as mentioned in the patent.

The Roberts et al patent discusses various prior chemical treatment processes and correctly notes that a recovery system involving water to absorb the $SO_2$ with subsequent desorption to liberate the $SO_2$ represents an approach which is superior to the various chemical treatment systems described. However, the Roberts et al system although basically sound, does require a rather severe penalty in the form of the large energy expenditure required to practice the disclosed technique. The Roberts et al method also creates operating difficulties and inefficiencies because of the intermixing of various flows and a lack of temperature balances.

BRIEF SUMMARY OF THE INVENTION

It is therefore of principal concern herein to provide an $SO_2$ absorption/desorption system which utilizes water as the operative medium, but which is highly efficient with respect to energy expenditure. Typically, the effluent gases from the combustion of a fuel such as coal containing 4% sulfur may be treated to remove 80% of the $SO_2$ content thereof with an attendant energy expenditure constituting approximately 4% of that derived from the fuel.

Basically, the present invention is directed to a method wherein various stages of the process are separated from each other in order to achieve the most efficient utilization of the input energy. Specifically, the method is characterized by employing a recirculating or closed water system at the absorption/desorption stages, which system contains a relatively small quantity of water. In this way, the desorption stage may operate also as a refrigerating stage so that when the water is recycled back to the absorption stage, the absorption stage may thereby be maintained or stabilized at the optimum temperature required to achieve effective absorption of $SO_2$.

The method herein also involves a precooling of the effluent gases first in a direct contact cooling stage and then by a secondary cooling state. The contact cooling is conducted in a recirculating or closed water system.

Although the advantages of precooling in two stages is apparent, there can be instances when a single stage cooler would be adequate.

The precooling stages as described also perform the important tasks of removing particulates and $SO_3$ from the effluent gas. In the contact cooling stage, a large proportion of the particulates become entrained in the recirculated water and most of the $SO_3$ present forms sulphuric acid with the water. In the secondary stage, the gas is further cooled so that the water vapor carried over from the contact stage is condensed. This condensation further aids in the capture of any remaining fine particulates and acid mist which is carried over from the contact stage. This cooled condensate is recycled back to the recirculating water system of the first stage. The cooling water for the precooling stages may consist in part of boiler feed water, steam from which boiler is utilized in the absorption/desorption stage.

The absorption/desorption stage constitutes an entirely separate recirculating or closed water system. The partially cleaned gas from the precooling stages is at a temperature in the order of 40°–125° F. and is contacted under substantially atmospheric pressure in a suitable absorber with the water of this second recirculating system to produce a stream of water with absorbed $SO_2$ which is at a temperature selected to absorb a sufficient quantity of $SO_2$ as to reduce the residual content in the effluent gas to the desired level. The cleaned $SO_2$-depleted gas is then discharged to the stack. Then the water stream is subjected to vacuum conditions to desorb the $SO_2$ while simultaneously producing a sufficient refrigerating effect on the water as to lower the temperature thereof to that degree required to stabilize the temperature of the aforesaid stream at said selected temperature.

By following the above basic concepts, environmentally safe effluent gas is discharged in a system which recovers the $SO_2$ as a useful by-product with high efficiency. The separate stages discussed above allow for heat balancing of the absorption/desorption stage with the preconditioning stage or stages such that the desorption cycle cools the final stage recirculating water to that degree required to stabilize the absorption cycle at the desired temperature. That is to say, the system of this invention is characterized by the fact that the absorption/desorption stage is isolated from other stages. This allows the absorption/desorption stage to be designed with the concept of energy balance incorporated therein. Specifically, the absorption/desorption stage embodies a water recirculation system having a limited capacity such that the desorption stage is capable of imparting sufficient refrigeration as to stabilize the absorption temperature at the desired value.

The invention is highly efficient in that it does not require a high energy penalty in order to achieve significant reduction of particulates, $SO_2$ and $SO_3$ while, at the same time, recovering the $SO_2$ in the form of a useful by-product. By the simple expedient of adding a rectifying inert gas stripper to the basic system, the recovered $SO_2$ is of highly pure form. The energy penalty paid for the inert gas stripper is more than offset by the reduced mass flow of the purified $SO_2$, thereby reducing the energy required to compress it to liquified form if desired.

BRIEF DESCRIPTION OF THE DRAWING FIGURES

FIG. 2 is a diagram illustrating a preferred embodiment of the invention;

FIG. 3 is a diagram illustrating the rectifying inert gas stripper; and

DETAILED DESCRIPTION OF THE INVENTION

Figure 1:
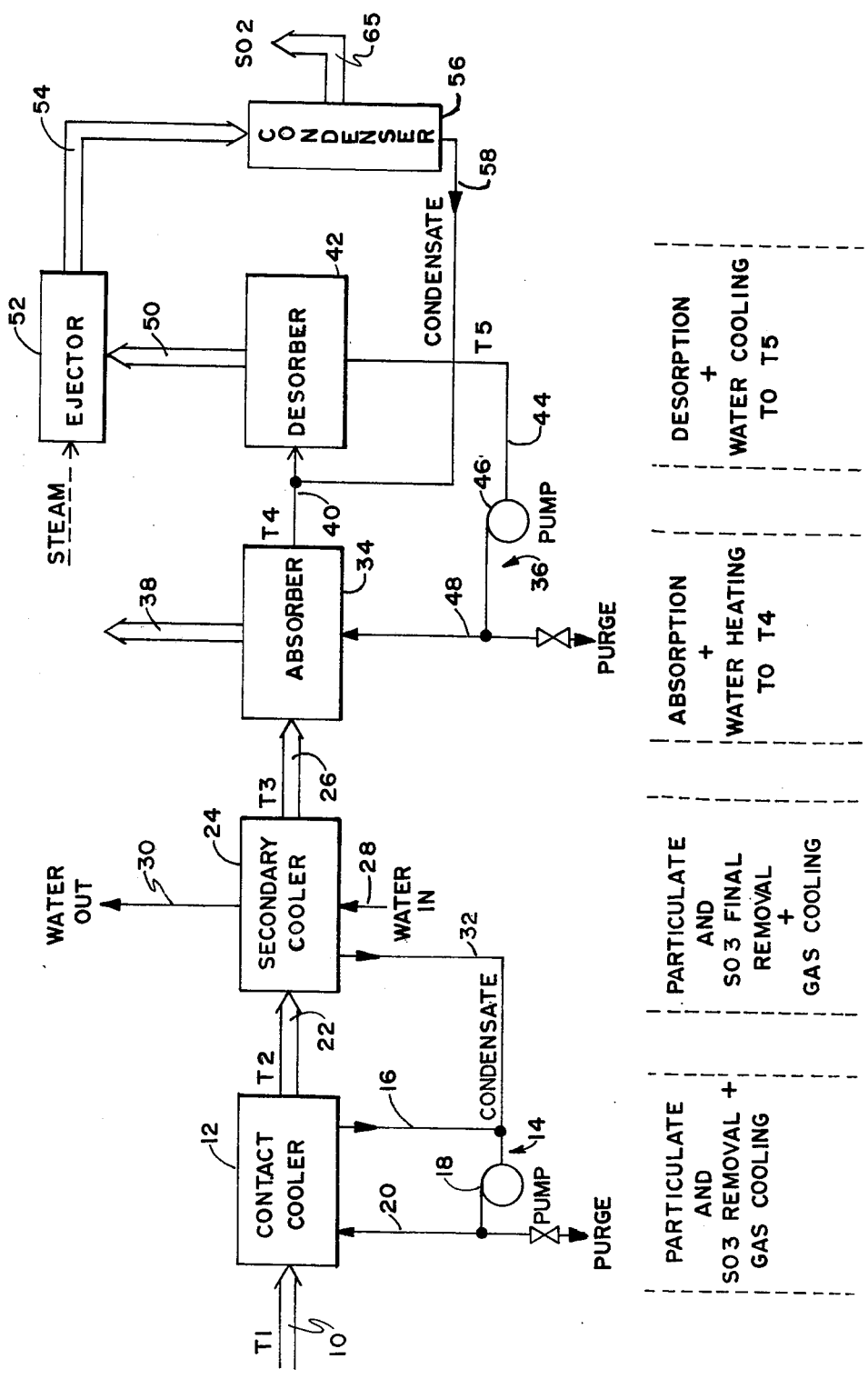
FIG. 1 is a flow diagram illustrating certain principles according to the present invention.

With reference at this time more particularly to FIG. 1, certain principles according to the present invention will be seen therefrom. The effluent gas from which $SO_2$ is to be removed is indicated by the reference character 10 and is directed to the contact cooler 12 with which is associated a first closed water circulating system indicated generally by the reference character 14. The water flow is from the line 16 from the cooler 12 to the pump 18 and back through the line 20 to the cooler 12, as illustrated. The entering gas in the stream 10 will typically be at a temperature $T_1$ which is in the order of about 300° F. and the stream of gas at 22 which leaves the cooler 12 will typically be at a temperature $T_2$ in the order of 150° F. The partially cooled recovered stream of gas 22 is then directed to the secondary cooler 24 and the further cooled stream of gas at 26 leaves the cooler 24 at a temperature $T_3$ typically in the range of 40°–125° F. The cooling water for the secondary cooler 24 is supplied at the line 28 and passes through coils or other cooling mechanism within the cooler 24 and leaves through the line 30. Condensate from the secondary cooler 24 leaves through the line 32 and is cycled to the closed system 14, as illustrated.

The cooled gas stream 26 is then applied to a suitable absorber 34 where the cooled gas stream is contacted with water flowing in a second closed system indicated generally by the reference character 36. The cleaned effluent gas is recovered in the stream 38 from the absorber 34 and may be discharged directly to the stack 40 while the water with absorbed $SO_2$ therein is circulated through the line 40 to the desorber 42. The closed system 36 includes the water stream 44 from the desorber 42 to the pump 46 and the return line 48 to the absorber 34. The desorbed $SO_2$ leaves the desorber 42 in the stream 50 to the stream ejector 52 (or other vacuum producing device) and the stream 54 from the ejector 52 is cycled to a condenser system 56, the condensate from which at the line 58 is returned to the stream 40 as shown and the recovered $SO_2$ stream 65 of which is recovered as indicated.

Certain principles will appear from the above general description of FIG. 1. First of all it will be noted that the preconditioning of the effluent gas prior to the absorption/desorption cycle is separate or isolated from the latter. That is to say, the water recirculating in the first closed system 14 is entirely separate from the water flow in the second closed system 36 and the cooling stage 24 employs cooling water separate from both. This constitutes an important principle according to the present invention inasmuch as the absorption/desorption cycle is carried on in the presence of a limited quantity of recirculating water whereby the vacuum conditions to which the water plus absorbed $SO_2$ stream 40 is subjected effects a significant decrease in the water temperature $T_5$ in the return line 44, 48 to the absorber 34. The system thus may be energy-balanced such that the temperature $T_5$ in FIG. 1 maintains or stabilizes the temperature $T_4$, temperature difference $T_4$–$T_5$ being what determines the quantity of $SO_2$ absorbed from the entering stream at 26.

Figure 4:
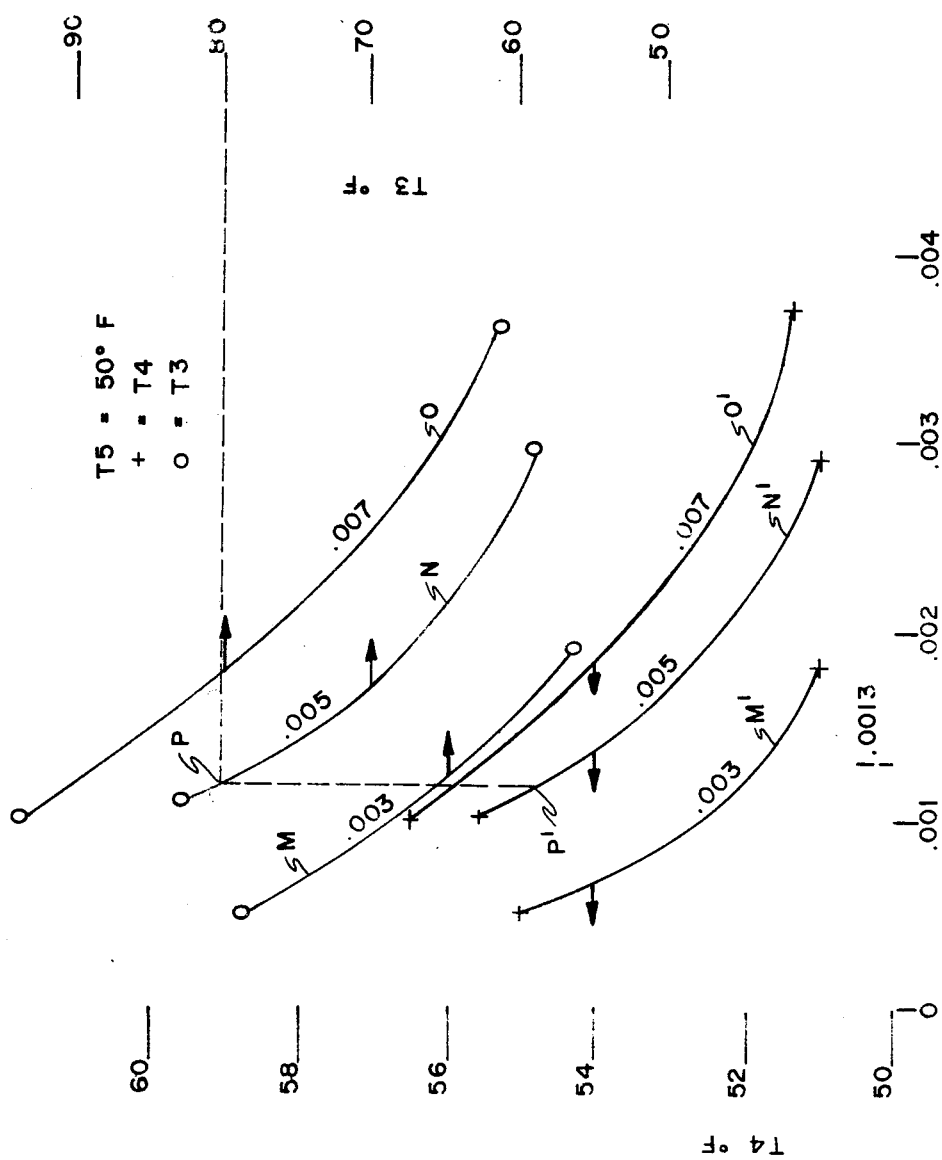
FIG. 4 is a chart illustrating the relationships among $T_3$, $T_4$ and $T_5$ of FIG. 1 when $T_5$ is 50° F. and with varying inlet $SO_2$ concentrations and varying effluent $SO_2$ concentrations.

This will be evident from FIG. 4. In this Figure, the temperature $T_5$ is selected for illustrative purposes to be 50° F. and three different concentrations of $SO_2$ in the entering stream 26 are represented by the curves M, N, O and M', N', O'. These concentrations are in pounds of $SO_2$ per pound of stream gas, and along the abscissa are plotted the $SO_2$ concentrations in the effluent gas stream 38. The current EPA maximum level of 0.0013 #$SO_2$/# gas from the New Source Standards for Coal Fired Boilers, when the BTU content of the coal is 13,000 BTU/#, is marked on the chart.

To take a specific example, if the temperature $T_3$ is 80° F. and the inlet concentration is 0.005 #$SO_2$/# gas, the horizontal projection from the 80° F. temperature to the curve N yields the point P. Projecting vertically downwardly from the point P to the curve N' yields the point P' which is opposite the required temperature $T_4$ of about 54.8° F. The resultant effluent concentration is about 0.0012 #$SO_2$/# gas. Thus, to obtain a particular effluent concentration, there is a definite relation among the temperatures $T_3$, $T_4$ and $T_5$ as illustrated in FIG. 4. The chart of FIG. 4 is of course simply calculated on the basis of equilibrium data.

As noted, the temperature at $T_4$ is also dependent upon the temperature at $T_3$ and the preconditioning stages are controlled in conjunction with the absorption/desorption cycle to effect the overall energy-balance or stability of the system. The entering gas stream at 26 will contain a quantity of $SO_2$ from which some specified percentage must be removed so that the residual $SO_2$ in the discharge gas 38 is within environmental limits. The quantity of $SO_2$ in the stream 26, on the other hand, will depend upon the origin of the effluent gas. For example, if the effluent gas is the product of combustion of a high sulphur coal, the $SO_2$ content in the stream 26 will be proportionally high and a relatively large percentage of $SO_2$ must be removed in the absorption/desorption cycle in order to meet the environmental standards. Thus, the temperature $T_4$ and the vacuum conditions in the desorption stage are selected both to remove the requisite quantity of $SO_2$ and to provide the degree of cooling required to stabilize the temperature $T_4$ at the required value. Thus, the preconditioning is controlled to provide the requisite temperature $T_3$ which, in conjunction with the temperature $T_5$ of the recirculating water stabilizes or maintains the selected temperature $T_4$ at which the requisite percentage of $SO_2$ is removed from the effluent gas.

It will further be noted that in the first recirculating system 14, most of the $SO_3$ content of the effluent gas and particulates will be removed and will be retained in that system. The temperature of the water circulating in the first system 14 purposely is maintained relatively high, in the order of 120° to 180° F. in order to minimize absorption of $SO_2$ while at the same time affording the addition of water vapor. It will also be noted that since the entering effluent gas in the stream 10 will contain some water vapor, the system 14 may be continuously or intermittently purged to compensate for the condensate entering the system through the line 32, thereby limiting the sulphuric acid concentration in the system 14. Very little $SO_2$ will leave in the purge stream because (1) the flow is small, (2) the temperature is high, and (3) the common ion effect depresses $SO_2$ solubility.

The secondary cooler 24 effects further removal or particulates and SO$_3$ which is carried back to the system 14 through the condensate line 32. Thus, the stream 26 is substantially depleted of particulates and SO$_3$ and contains essentially all of the entering SO$_2$ plus inert gases such as N$_2$, CO, CO$_2$, etc.

As will be pointed out hereinafter, to effect most efficient SO$_2$ removal and energy-balance, the desorber 42 preferably is operated as a multi-stage steam ejector system.

A preferred embodiment of the invention is illustrated in FIG. 2. As illustrated, the entering gas stream 10 is applied to the contact cooler 12 which has the first recirculating water system associated therewith. A cooling tower 62 has been added to this closed system in order to maintain the water temperature at the desired value and FIG. 2 also illustrates the purge line 64 which discharges to the basin 66 to which neutralizing limestone or the like at 68 is also added.

The secondary cooler 24 employs cooling not only by boiler make up water stream in the line 60 but also the external cooling water source 70 or cooling tower 62 as illustrated. Additionally, the optional cooler 20 may be used in the line 14 as shown. The make up water is applied to the boiler 72 which generates steam for the system as indicated at line 74. The final cooler 76 has been added and is an optional cooler which is provided both for more precise control and also preliminarily to heat the SO$_2$ depleted gas stream 38 emanating from the absorber 34. The waste gas is applied through the line 78 to the heater 80 and the cleaned gas stream 82 is discharged therefrom to the atmosphere. The purpose of the heater 80 is to effect a heating of the waste gases so that a more efficient atmospheric dispersion thereof is effected.

The finally cooled gas stream at 84 is that which is applied to the absorber 34 and the second recirculating water system 36 includes the previously mentioned pump 46 and the discharge line 48 which is applied to the tower or other absorber 34 as indicated. In the case of FIG. 2, however, a rectifying inert gas stripper 86 and associated stream ejector 88 is inserted between the absorber 34 and the desorber 42. Some of the water from line 48 is passed to the stripper 86 and some of the steam from the line 74 is utilized in the ejector 88 and the inert gases such as N$_2$, CO, CO$_2$, etc. are recycled back to the entering gas stream 10 as indicated. Thus, most of the inert gas has been removed from the enriched SO$_2$ line 90 from the absorber so that the line 92 contains essentially only the absorbed SO$_2$. The details of the stripper 86 and the proper relations among the inputs, outputs and packing thereof are shown in FIG. 3.

The desorber shown in FIG. 2 is a multiple stage device having associated individual ejectors indicated generally by the reference character 100 which are fed by steam lines from the boiler 72 as illustrated. Typical refrigeration type evaporators are used, individual ejectors or other vacuum producing devices are employed for flexibility of control. The exhaust from the ejector 100 is applied both to the condenser 102 over the line 104 and also, over the line 106 to the heater 80 for the exhaust stack gases. The by-product which is recovered at the line 106 is essentially highly pure SO$_2$ and the condensate in the line 108 as well as the condensate in the line 110 is returned to the line 92 leading to the desorber 42, as illustrated. The system illustrated in FIG. 2 provides for highly efficient energy balance while, at the same time, recovering a highly purified form of SO$_2$ which, by reason of its purity may be economically compressed to liquid form without paying an excessive energy penalty which would otherwise be due to the presence of inert gases in the by-product.

What is claimed is:

1. The method of removing particulates, SO$_2$ and SO$_3$ from an effluent gas, which comprises the steps of;
  (a) contacting the effluent gas with water in a first stage closed recirculating water system and recovering the gas with particulates and SO$_3$ partially removed therefrom;
  (b) cooling the gas recovered from step (a) to a temperature sufficient to cause condensation of water vapor whereby further to remove particulates and SO$_3$ all of which are returned to step (a), and recovering the cooled gas;
  (c) in a further stage isolated both as to liquid and vapor phases from those of steps (a) and (b), first absorbing SO$_2$ from cooled gas from step (b) under substantially atmospheric pressure by contact with water flowing in a second closed system to produce water plus absorbed SO$_2$ at a temperature which is selected to obtain a cleaned effluent gas discharge from which a predetermined percentage of SO$_2$ has been removed and then desorbing the SO$_2$ under vacuum conditions sufficient to desorb the required amount of SO$_2$ while simultaneously cooling the water to a temperature which stabilizes the temperature of the water plus absorbed SO$_2$ at said selected temperature.

2. The method of removing a selected percentage of SO$_2$ from an effluent gas, which comprises the steps of:
  (a) circulating water in a first closed system and contacting the effluent gas with the water in one region of said first system for a time sufficient to cool the gas to a first temperature while removing particulates and SO$_3$ from the gas, and recovering the gas from said one region;
  (b) cooling gas recovered from step (a) by secondary cooling for a time sufficient to cool the gas to a second temperature while condensing water vapor from the gas to remove further particulates and SO$_3$ from the gas, recovering the gas and recycling the condensate to the closed system of step (a);
  (c) at least periodically purging water from the closed system of step (a) to remove excess condensate, particulates, and SO$_3$;
  (d) circulating water in a second closed system isolated both as to liquid and vapor from said first system and contacting gas recovered from step (b) with water in one region of said second system substantially at atmospheric pressure and for a time sufficient to absorb SO$_2$ while heating the water to a third temperature which is selected to assure removal of said selected percentage of SO$_2$ from the effluent gas, and discharging the SO$_2$-depleted gas; and
  (e) subjecting the water plus absorbed SO$_2$ in a second region of said second system to vacuum conditions sufficient to (i) desorb SO$_2$ and (ii) cool the water to a fourth temperature sufficient to stabilize said third temperature at its selected value.

3. The method as defined in claim 2 wherein the desorption of SO$_2$ is effected by steam ejection.

4. The method as defined in claim 3 including the step of stripping inert gases from at least some of said water flowing back to said one region.

5. The method of removing $SO_2$ from an effluent gas which is at a temperature of at least about 300° F., which comprises the steps of:
  (a) recirculating a limited quantity of water in a first closed system, contacting the effluent gas therewith for a time sufficient to absorb $SO_3$ and remove particulate from the gas, recovering the $SO_3$- and particulate-depleted gas, and controlling the temperature of the recirculating water to a value in the order of 150° F. whereby minimally to absorb $SO_2$;
  (b) purging and neutralizing water from the closed system of step (a) to maintain sulphuric acid content of such closed system below a selected value;
  (c) cooling the gas recovered from step (a) to a temperature in the range of about 40°–125° F. to condense water and capture sulphuric acid mist and remove particulates therefrom;
  (d) recirculating a limited quantity of water in a second closed system isolated both as to liquid and vapor phases from the first system, contacting the cooled gas of step (c) therewith at substantially atmospheric pressure in one region of said second system for a time sufficient to produce a stream of water plus absorbed $SO_2$ which is at a selected temperature less than the temperature of step (c), discharging the $SO_2$-depleted gas from said one region, subjecting the water plus absorbed $SO_2$ to vacuum conditions in a second region of said second system to remove a desired quantity of absorbed $SO_2$ while simultaneously lowering the temperature of the water to an energy-balancing value, recovering the desorbed $SO_2$, and controlling said energy-balancing temperature value of water recirculated to said one region so as to stabilize said selected temperature of the water plus absorbed $SO_2$ to a value which causes adsorption of a predetermined quantity of $SO_2$ from the cooled gas of step (c).

6. The method as defined in claim 5 including the step of stripping inert gases from at least some of said water flowing back to said one region.

* * * * *